J. H. SAGER.
BUMPER FOR AUTOMOBILES.
APPLICATION FILED APR. 13, 1917.

1,251,697.

Patented Jan. 1, 1918.

Inventor:
James H. Sager
by his attorneys

UNITED STATES PATENT OFFICE.

JAMES H. SAGER, OF ROCHESTER, NEW YORK, ASSIGNOR TO J. H. SAGER COMPANY, OF ROCHESTER, NEW YORK, A CORPORATION.

BUMPER FOR AUTOMOBILES.

1,251,697.  Specification of Letters Patent.  Patented Jan. 1, 1918.

Application filed April 13, 1917. Serial No. 161,748.

*To all whom it may concern:*

Be it known that I, JAMES H. SAGER, a citizen of the United States, and resident of Rochester, in the county of Monroe and State of New York, have invented certain new and useful Improvements in Bumpers for Automobiles, of which the following is a specification.

The present invention relates to bumpers for automobiles, and more particularly to the connection between the supporting arms thereof and the vehicle frame bar, an object of this invention being to provide a construction in which the supporting arms may be connected to the frame bars without any perforation of the latter, and notwithstanding the provision on one side of the frame bars of splash guards, or other devices, which would prevent the fastening means passing about the frame bars.

To these and other ends, the invention consists of certain parts and combinations of parts all of which will be hereinafter described, the novel features being pointed out in the appended claims.

In the drawings:—

Figures 1, 2, 3, 4:
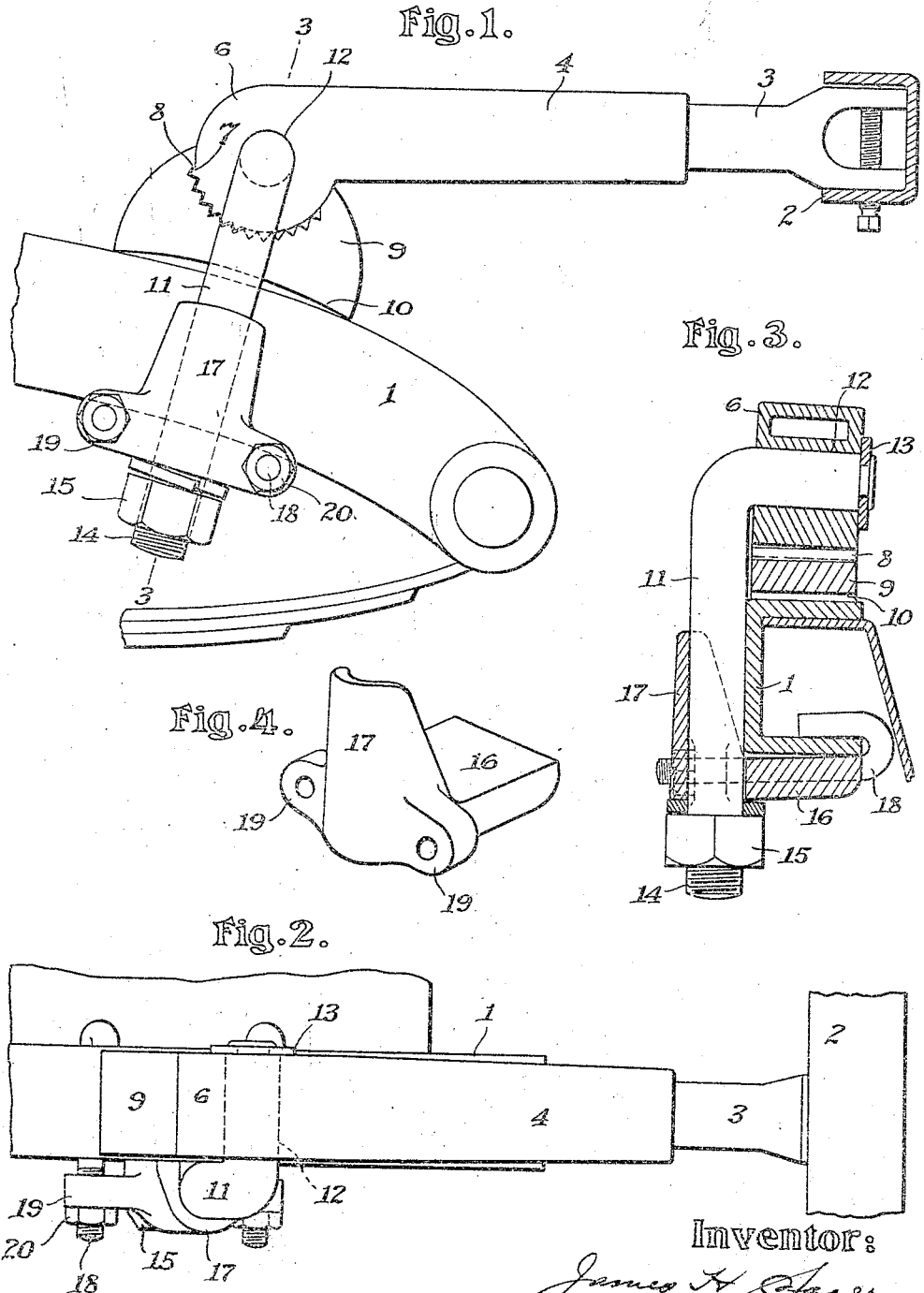
Figure 1 is a side view of the forward end of a vehicle frame bar, showing the improved connection between the latter and the bumper supporting arm.
Fig. 2 is a plan view of the construction shown in Fig. 1.
Fig. 3 is a section on the line 3—3, Fig. 1.
Fig. 4 is a perspective view of the adjustable clamping member.

Referring more particularly to the drawings, 1 indicates the forward curved end of the channeled frame bar of a vehicle, and 2 the bumper bar which is supported near opposite ends by supporting arms, only one of which is shown. Each supporting arm, in this instance, comprises an outer member 3 guided on an inner member with a coiled spring 5 interposed between them, and permitting the yielding of the bumper bar 2 in a known manner. The inner end of the supporting arm preferably has an enlargement 6, with one face thereof out-curved and provided with teeth 7. This out-curved, enlarged portion 6 is received within an in-curved portion or pocket 8 of a block 9, the wall of the pocket being provided with teeth for engagement by the teeth 7, so as to prevent any slipping action of the portion 6 in the pocketed or in-curved portion 8. The under side of the block 9 is preferably curved at 10, so that it may conform substantially to the curve at the forward end of the frame bar 1, the block 9 being provided in order that the supporting arms of the bumper bar 2 may be maintained horizontal, notwithstanding the curves of the forward ends of the vehicle frame bars 1. As is apparent, this block may be shifted along the frame bar 1 until it assumes the desired position thereon, after which the supporting arm may be turned to a horizontal position. So far as certain features of this invention are concerned, the block 9 is not necessary thereto.

To the end of clamping each supporting arm to its frame bar 1, a clip 11 may be provided, this clip, in this instance, comprising a member or bolt of L formation, and having one arm thereof engaging the bumper supporting arm, preferably by passing through an opening 12 in the enlarged portion 6 of the arm, said opening being, in this instance, concentric with the curved toothed portion, so that the bolt acts as a pivot on which the bumper supporting arm may be swung. A washer 13 on the end of the bolt serves to hold the bolt to the bumper supporting arm. The other or upright arm of the L-shaped bolt 11 is provided with a screw-threaded portion 14 on which a nut 15 turns. On this upright arm of the bolt 11, above the nut, is guided a clamping member 16 for coöperation with the under side of the channel bar 1. This clamping member 16 has an extension 17 for coöperating with the bolt above the channel bar 1, so that a wide bearing on the bolt is obtained to prevent any twisting action of the clamping member of the clip. It is preferred that the shorter and upper arm of the bolt 11 shall have its longitudinal axis converge with reference to the longitudinal axis of the member 16, as by this arrangement greater pressure is provided on the channel bar 1 at the upper edges of the flanges of the channel bar, so that there is a tendency to force the edges of the channel bar toward each other, and in this way prevent the withdrawal of the bumper supporting arm.

To still further prevent the withdrawal of the bumper supporting arm, the clamping member 16 carries two devices which engage the lower flange of the channel bar 1. These devices are, in this instance, in the form of hook bolts 18 engaging over the lower flange of the channel bar, and extending under the latter, and through two perforated lugs 19 on the clamping member 16, these bolts being provided with nuts 20 by which they may be firmly drawn into engagement with the channel bar 1.

By the foregoing construction it will be seen that the bumper supporting arm is secured to the channel bar from one side of the latter only, thus leaving the other side free for the provision of a splash guard, mud guard, or other device, which would utilize such a space. The clamping means acts on the channel bar in a manner to exert greater pressure on the channel bar near the free edges of the flanges, thus tending to contract or compress the channel bar at this point, making it difficult to withdraw the bumper arm laterally from the channel bar 1. This lateral withdrawal is further prevented by two hooked bolts carried by the adjustable clamping member of the clip, and engaging the lower flange of the channel bar.

What I claim as my invention and desire to secure by Letters Patent is:—

1. The combination with a channeled frame bar opening horizontally and a bumper supporting arm, of means for securing the arm to the frame bar comprising a fastening bolt connected to the bumper supporting arm to hold the latter on the upper side of the frame bar and lying on a vertical side of the frame bar, and means adjustable on said bolt and carrying a hooked device for engaging about the lower flange of the frame bar.

2. The combination with a channeled frame bar opening horizontally and a bumper supporting arm, of means for securing the arm to the frame bar comprising a fastening bolt connected to the bumper supporting arm to hold the latter on the upper side of the frame bar, a clamping member adjustable on the bolt to engage the under side of the frame bar, and a hook carried by said clamping member for engaging about the lower flange of the frame bar.

3. The combination with a channeled frame bar opening horizontally and a bumper supporting arm, of means for securing the arm of the frame bar comprising a fastening bolt engaging the supporting arm and lying on one side of the frame bar to hold the supporting arm on the upper side of the frame bar, a clamping member adjustable on the bolt, and a hook adjustable on the clamping member and engaging the lower flange of a frame bar.

4. In combination with a channeled frame bar opening horizontally with a bumper supporting arm, means for securing the arm to the channeled frame bar comprising an L-shaped fastening bolt having one arm thereof engaging the bumper supporting arm to hold the latter to the vehicle frame bar, and the other arm lying on a vertical side of the frame bar, and a clamping member guided on the vertical frame of the bolt, the longitudinal axis of the clamping member, and the longitudinal axis of the arm of the bolt which engages the bumper supporting arm, converging with reference to each other, so as to produce a greater compression action on the frame bar near the free edges of the flanges of said bar.

5. A support for buffer bars of automobiles comprising a supporting arm having an end formed with a toothed out-curved portion, and also with an opening substantially concentric with said toothed outcurved portion, a block adapted to rest upon the vehicle frame and formed with a toothed in-curved portion receiving the out-curved portion of the supporting arm, an L-shaped fastening bolt having one arm passed through the opening of the supporting arm, and a clamping member adjustable on the other arm and engaging the vehicle frame to hold the block to the frame and the supporting arm to the block.

6. In combination with a vehicle frame, a bumper supporting arm, and a block interposed between the arm and the frame to permit the arm to swing on the block to assume a horizontal position, means for securing the arm of the vehicle comprising an L-shaped fastening bolt having one arm passed through said bumper supporting arm, and a clamping member adjustable on the other arm of the bolt to engage the frame to hold the block to the frame and the supporting arm to the block.

7. In combination with a channeled frame bar opening horizontally and a bumper supporting arm, means for securing the arm to the vehicle comprising an L-shaped fastening bolt having one arm thereof engaging the bumper supporting arm, a clamping member adjustable on the other arm of the bolt, and a hooked bolt carried by said clamping member and engaging the lower flange of the vehicle bar.

8. In combination with a channeled frame bar opening horizontally and a bumper supporting arm, means for securing the arm to a vehicle frame bar comprising an L-shaped bolt having one arm thereof engaging the bumper supporting arm, a clamping member guided on the other arm of said bolt, and two hooked bolts carried by said clamping member on opposite sides of the bolt and engaging the lower flange of the vehicle frame bar.

JAMES H. SAGER.